G. NISSEN.
SNATCH BLOCK.
APPLICATION FILED APR. 23, 1912.
1,070,834.
Patented Aug. 19, 1913.
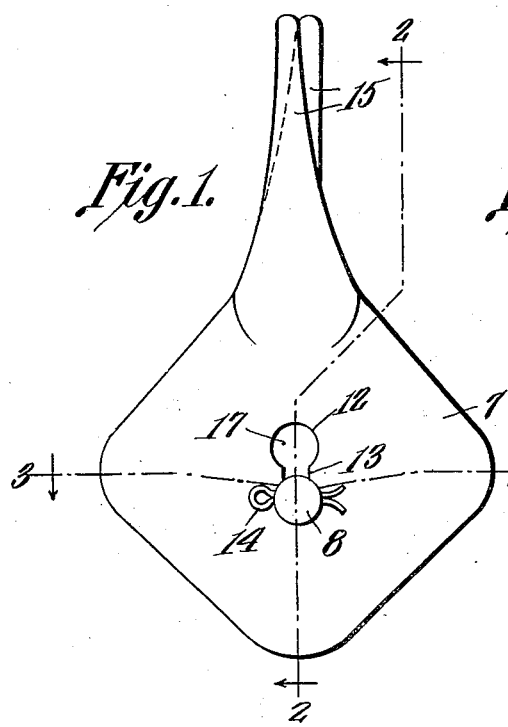
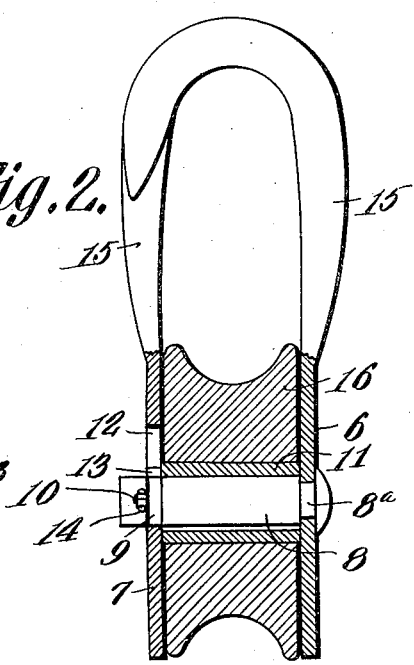
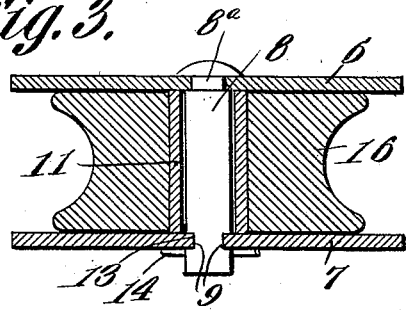
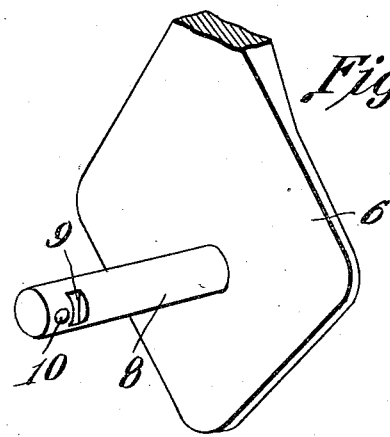
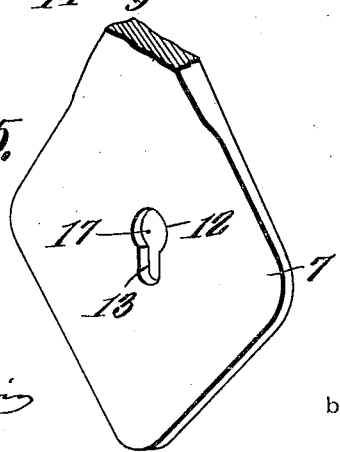
George Nissen, Inventor
Witnesses
by C. A. Snow & Co.
Attorneys

UNITED STATES PATENT OFFICE.

GEORGE NISSEN, OF IOWA FALLS, IOWA.

SNATCH-BLOCK.

1,070,834.     Specification of Letters Patent.     Patented Aug. 19, 1913.

Application filed April 23, 1912. Serial No. 692,629.

*To all whom it may concern:*

Be it known that I, GEORGE NISSEN, a citizen of the United States, residing at Iowa Falls, in the county of Hardin and State of Iowa, have invented a new and useful Snatch-Block, of which the following is a specification.

This invention relates to snatch blocks, and has for its primary object to provide a device of this character wherein a cable or rope may be readily engaged therewith and released therefrom.

This invention also contemplates a device of this character which shall be simple, durable, substantial and inexpensive in construction, as well as convenient and efficient in use, and which will not be liable to accidentally release the cable or rope.

With the foregoing and other objects in view, which will be apparent as the invention is better understood, this invention resides in the novel construction and combination of parts hereinafter set forth and particularly pointed out in the appended claims, reference being had to the accompanying drawings wherein the invention is illustrated in its preferred embodiment, and wherein:—

Figure 1 is a side elevation of the present snatch block. Figs. 2 and 3 are sections taken on the lines 2—2 and 3—3 of Fig. 1, respectively. Figs. 4 and 5 are fragmental perspectives of the cheek plates employed in the snatch block.

Referring specially to the drawings, wherein similar reference characters have been employed to denote corresponding parts, the cheek plates have been designated by the numerals 6 and 7, these cheek plates being shown as square or rectangular in contour, but it is understood that the same may be of any desired form. Each of the cheek plates is provided with an inturned hook 15, which are arranged to overlap and to be separated in a manner hereinafter described.

A pulley axle 8 is secured to the inner side of the cheek plate 6, this pulley axle having a reduced and non-circular portion $8^a$ riveted through the cheek plate 6 in order that the pulley axle will be rigidly carried by the said cheek plate. The pulley axle 8 is provided with opposite channels 9 adjacent its free end, and next outside the said channels is provided with a diametrical opening 10. The opening 10 is designed for the insertion of a cotter pin or other locking member 14. The cheek plate 7 is provided with a key-hole opening 17, the head and tail of which have been designated by the respective numerals 12 and 13. The head 12 of the key-hole opening is disposed toward the hook 15 of the cheek plate 7 so that the tail 13 extends away from the said hook. The free end of the pulley axle 8 passes through the key-hole opening and is of a diameter equal to or slightly smaller than the head of the key-hole opening so that the axle may be readily inserted through the head of the key-hole opening. The cotter pin 14 is arranged over the outer face of the cheek plate 7 in order to retain the cheek plate 7 on the axle ordinarily, thus permitting the removal of the cheek plate 7 when the said cotter pin is removed, as will be apparent.

This snatch block is so designed that when the axle 8 passes through the head 12 of the key-hole opening, the hook 15 of the cheek plate 7 will be off-set inwardly or radially relative to the hook of the other cheek plate, and the cheek plate 7 will be permitted to rotate relative to the cheek plate 6 in order that the hooks may be swung apart, thereby permitting the insertion of the cable or rope between the hooks and the cheek plates. When the hooks are swung together and the hook 15 of the cheek plate 7 is drawn outwardly or radially of the axle to overlap the hook of the cheek plate 6, the channels 9 will be drawn into engagement with the edges of the tail 13 of the key-hole opening, which will constrain the cheek plates against rotation relative to each other when the hooks are in overlapped position.

A pulley or sheave 16 is mounted on the axle 8 between the cheek plates, and is provided with a bushing 11 encompassing the axle.

The hooks 15 taper toward the free ends thereof so that when the spokes are overlapped, the combined dimensions of the overlapped portions will be equal throughout.

It will appear that in the use of the present snatch block, the cheek plate 7 may be readily slid downwardly or eccentric relative to the plate 6 to separate the hooks 15 and bring the axle 8 into the head 12 of the key-hole opening, in which event, the cheek plates may be rotated relative to each other so as to swing the hooks apart. When the hooks are thus swung apart, a rope or cable may readily be inserted between the hooks and cheek plates onto the pulley or sheaves 16, or a cable or rope already on the pulley or sheave may be released from the snatch block. Then by swinging the hooks 15 together and then drawing the cheek plate 7 upwardly or into normal concentric position relative to the plate 6, the channels 9 will again be made to engage the edges of the tail 13 of the key-hole opening to lock the cheek plates against rotation and longitudinal movement relative to each other when the hooks 15 are made to overlap. Thus when the present snatch block is in use and the hooks 15 are engaged by any suitable means, the snatch block is prevented from opening to accidentally release the cable or rope.

The present snatch block is simple, durable, substantial and inexpensive in construction, as well as convenient and efficient in use, and it will appear that the two hooks 15 provide for greater strength than a single hook swiveled or otherwise attached to the cheek plates.

This device may be readily assembled and taken apart for purpose of repair or replacement of broken parts.

The various parts may be constructed of any suitable material, and this device is susceptible of various alterations in its details, such as changes in size, proportions and the like, within the scope of the appended claims without departing from the spirit of the invention.

Having described the invention what is claimed as new is:—

1. A snatch block embodying cheek plates having hooks arranged to overlap and one cheek plate having a key-hole opening, and a pulley axle carried by the other cheek plate and engaging through the key-hole opening and having opposite channels adapted to engage the edges of the tail of the key-hole opening when the hooks are overlapped.

2. A snatch block embodying cheek plates having hooks arranged to overlap, and a pulley axle secured to one cheek plate, the other cheek plate having an opening to rotatably receive the end of the axle when the hooks are separated, and the opening extending into a contracted portion to receive the axle when the hooks are overlapped so as to constrain the cheek plates against rotation relative to each other, the axle having a channel in one side to engage one edge of the contracted portion of the opening so as to lock the plates against movement to and from each other.

In testimony that I claim the foregoing as my own, I have hereto affixed my signature in the presence of two witnesses.

GEORGE NISSEN.

Witnesses:
 B. M. BIRDSALL,
 T. E. BELL.

---

Copies of this patent may be obtained for five cents each, by addressing the "Commissioner of Patents, Washington, D. C."